United States Patent [19]

Pula

[11] Patent Number: 5,425,097
[45] Date of Patent: Jun. 13, 1995

[54] ANALOG DISPLAY STATION APPARATUS AND METHOD OF EFFECTING TELEPHONE FEATURES

[75] Inventor: Michael K. Pula, Naperville, Ill.

[73] Assignee: AT&T Corp., Murray Hill, N.J.

[21] Appl. No.: 73,004

[22] Filed: Jun. 7, 1993

[51] Int. Cl.⁶ .............................................. H04M 1/02
[52] U.S. Cl. .................................... 379/396; 379/387; 379/201; 379/210; 379/215
[58] Field of Search ............... 379/200, 201, 210, 211, 379/212, 215, 354, 355, 387, 396

[56] References Cited

U.S. PATENT DOCUMENTS

| | | | |
|---|---|---|---|
| 4,291,198 | 9/1981 | Anderson et al. | 379/354 |
| 4,453,040 | 6/1984 | Wolf et al. | 379/200 |
| 4,788,720 | 11/1988 | Brennan et al. | 379/354 |
| 4,897,866 | 1/1990 | Majmudar et al. | 379/201 |

FOREIGN PATENT DOCUMENTS 63-78696 4/1988 Japan ........................... H04Q 3/545

OTHER PUBLICATIONS

"An Experimental Teleterminal-The Software Strategy," The Bell System Technial Journal, Jan. 1983, pp. 121-152.

"An Interactive Touch Phone for Office Automation," IEEE Communications Magazine, Feb. 1985, vol. 23, No. 2 pp. 21-26.

"Touchphone: a New Generation in Telephone Design" Bell Northern Reserach, Ltd., 2nd quarter 1985, pp. 20-25.

"Smart Phones" Popular Science, Nov. 1990, p. 47.

"Generic Requirements for an SPCS to Customer Premises Equipment Data Interface for Analog Display Services", Bellcore Technical Reference, TR-NW-T-001273, Issue 1, Dec. 1992.

*Primary Examiner*—James L. Dwyer
*Assistant Examiner*—M. W. Shehata
*Attorney, Agent, or Firm*—Ross T. Watland; Jack R. Penrod

[57] ABSTRACT

An arrangement where display control data which has been developed off-line, and which specifies the content and sequence of the display screens required to lead a customer through activation of a plurality of telephone features, is received and stored by an analog display station either at an initialization or a feature update of the station. The display control data is used by the station to communicate information relating to a particular feature to a user via the station display. The user inputs, e.g., keystrokes, received after each display screen, are stored by the station, and after the sequence has been completed, all such stored user inputs are rapidly transmitted to the switching system to effect the particular feature. Significantly, the switching system telephone feature software is not involved until after all stored user inputs are transmitted. Therefore, there is no need to modify existing software as long as the user inputs are not changed.

13 Claims, 5 Drawing Sheets

(PRIOR ART)

ANALOG DISPLAY STATION APPARATUS AND METHOD OF EFFECTING TELEPHONE FEATURES

TECHNICAL FIELD

This invention relates to telecommunications.

BACKGROUND AND PROBLEM

Figure 4:
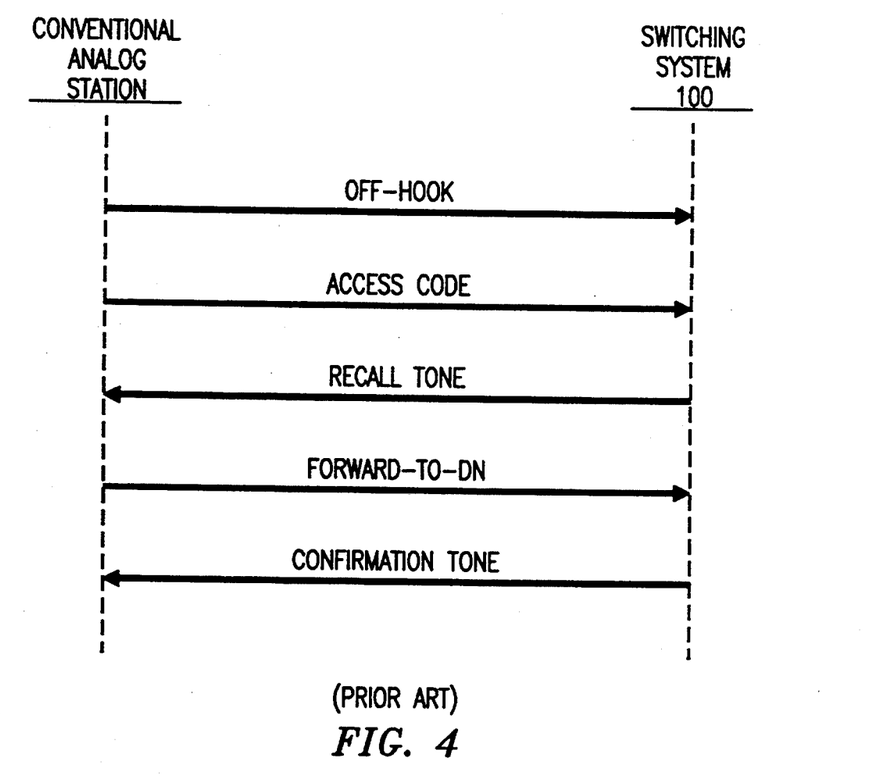
FIG. 4 is a message sequence diagram for the prior art call forwarding activation sequence used by conventional analog stations.

As stored program-controlled switching systems have evolved, a wide variety of useful features have been developed to extend the communication capabilities such systems provide. One example is call forwarding where a customer provides a forward-to directory number to the switching system and the switching system thereafter forwards all incoming calls for the customer to the provided directory number. Other examples include call waiting, three-way calling, privacy calling, and automatic callback. Many customers find the activation sequences for such features confusing. For example, to activate call forwarding (FIG. 4), a customer must first go off-hook and dial the access code (*72) for call forwarding, then wait for a recall tone (second dial tone) to dial the forward-to directory number. The customer then receives a confirmation tone indicating that call forwarding has been activated.

Figure 5:
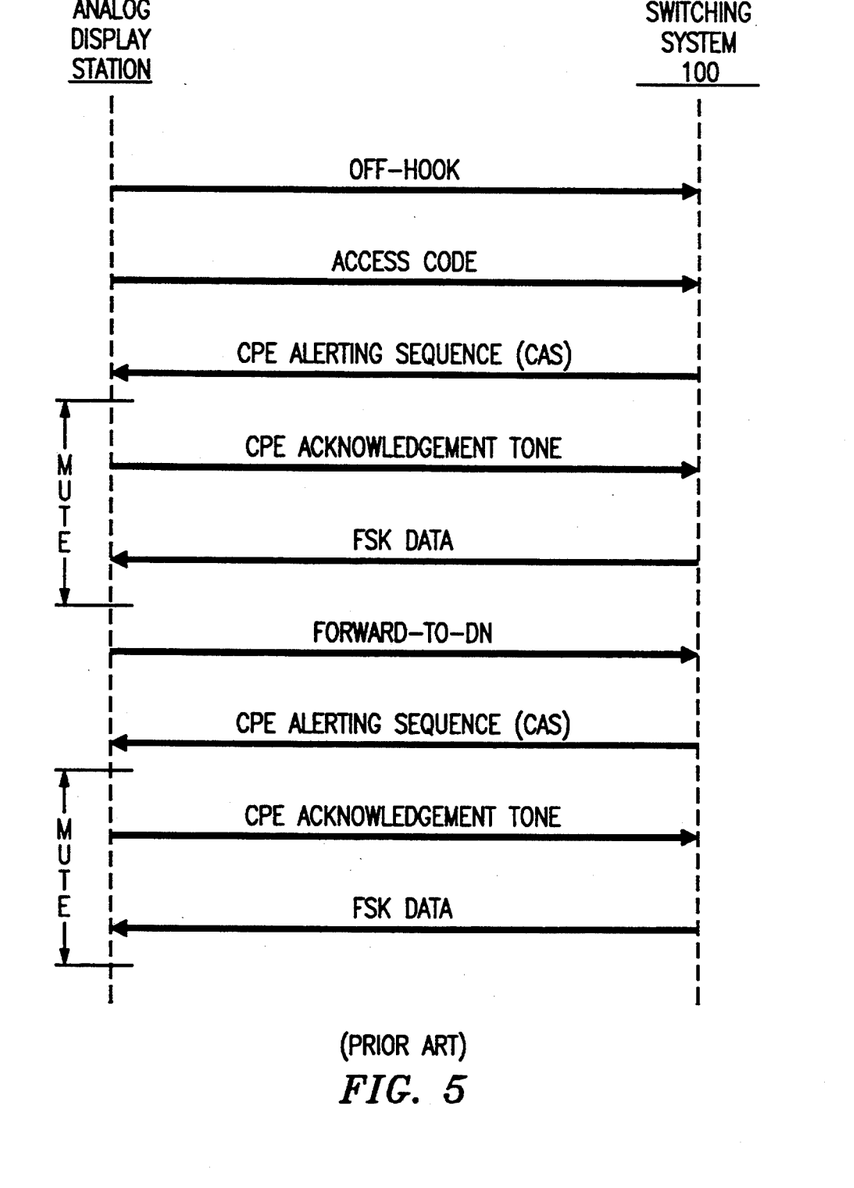
FIG. 5 is a diagram of a prior art call forwarding activation sequence for use by analog display stations.

The activation sequences for telephone features can be made more user-friendly by including in the telephone station a display with associated control keys much like those widely used for automatic teller machines. The display can be used to guide the customer through the activation sequence. The requirements for the interface between such stations, referred to herein as analog display stations, and a stored program-controlled switching system are specified in Bellcore TR-NWT-001273 issued December 1992. A diagram of the activation sequence for call forwarding is shown in FIG. 5. After going off hook, the station displays a menu of telephone features for selection by the customer. The customer presses the key for call forwarding and the station transmits the access code (*72) for call forwarding to the switching system. The switching system transmits a CPE alerting sequence (CAS) comprising a 50 millisecond burst of the dual tones 2170 Hertz and 2300 Hertz to determine whether the calling station is an analog display station. If it is, the station is muted and the station returns a CPE acknowledgement tone (DTMF "A"). The switching system returns frequency shift keyed (FSK) encoded text which causes the station to display a prompt for the forward-to-DN. The station is then unmuted. The customer then keys in the forward-to-DN and the station transmits the keyed forward-to-DN to the switching system. In response, the switching system again transmits the CPE alerting sequence, the station is muted, and the switching system receives a CPE acknowledgement tone from the station. The switching system transmits to the station FSK encoded text comprising a message confirming that call forwarding is activated.

Although this arrangement provides for user-friendly feature activation, it substantially complicates the switching system software for each telephone feature. It also uses switching system resources inefficiently because the speed of interaction between the switching system and, the station is limited by human inputs such as keying in the forward-to-DN in the call forwarding example.

SOLUTION

These problems are solved and a technical advance is achieved in an exemplary arrangement where display control data, which has been developed advantageously off-line, and which specifies the content and sequence of the display screens required to lead a customer through activation of a plurality of telephone features, is received and stored by an analog display station either at an initialization or a feature update of the station. The display control data is used by the station to communicate information relating to a particular feature to a user via the station display. The user inputs, e.g., keystrokes, received after each display screen, are advantageously stored by the station, and after the sequence has been completed, all such stored user inputs are rapidly transmitted to the switching system to effect the particular feature. Significantly, the switching system telephone feature software is not involved until after all stored user inputs are transmitted. Therefore, there is no need to modify existing software as long as the user inputs are not changed.

A method in accordance with the invention is used in an arrangement comprising a telephone station including a display, a switching system connected via a telephone line to the station and capable of providing a plurality of telephone features for use at the station, and means for selectively connecting a source of display control data to the station. In accordance with the method, the station receives display control data from the source via the connecting means and stores such data in the station. To effect at least one of the telephone features, the station uses the stored display control data to communicate information relating to the feature to a user via the display. The input received from the user in response to the communicated information is also stored by the station. That stored input is then used to communicate with the switching system to effect the feature.

DETAILED DESCRIPTION

Figure 1:
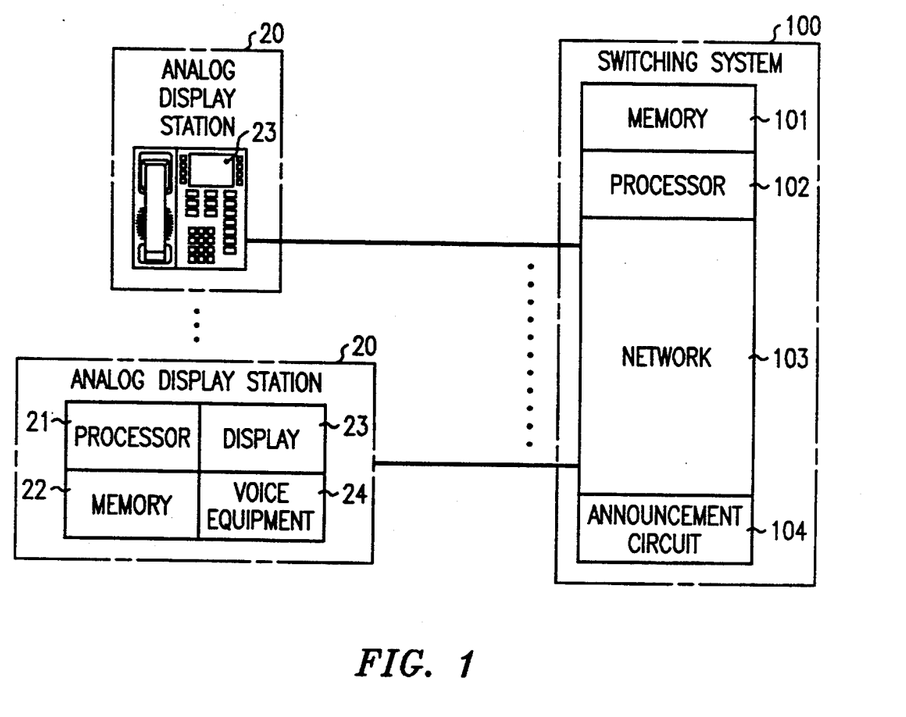
FIG. 1 is a diagram of an arrangement where an exemplary method of the invention is performed.

FIG. 1 is a diagram of an arrangement where an exemplary method of the invention is performed. The arrangement includes a plurality of analog display stations 20. An analog display station 20 includes a processor 21 and associated memory 22, a display 23, and conventional voice equipment 24, and is connected by a conventional analog line to switching system 100. Switching system 100 is a stored-program-controlled switching system, e.g., the AT&T 1AESS ™ or 5ESS ® switching systems, and includes a control processor 102 and associated memory 101, a switching network 103 and an announcement circuit 104, e.g., the AT&T 14A announcement circuit. Although announcement circuit 104, which is used as the source of display control data in this embodiment, is internal to system 100, other computers or databases external to system 100 and connected, for example, via a long distance network (not shown), could alternatively be used as the source of display control data.

Figure 2:
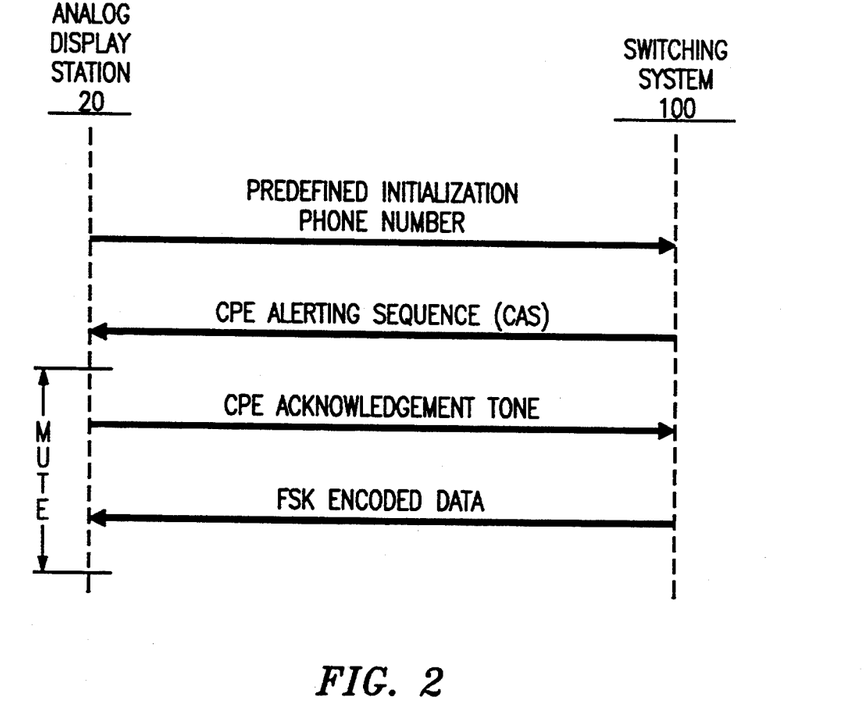
FIG. 2 is a message sequence diagram for initialization of an analog display station included in the arrangement of FIG. 1.

In the present embodiment, stations 20 may subscribe to nine telephone features: automatic callback, automatic recall, call forwarding, call waiting, cancel call waiting, customer originated trace, distinctive ringing, per-call privacy and three-way calling. After an analog display station 20 is purchased, it is plugged into a telephone outlet and the initialization sequence of FIG. 2 is performed. The user dials a predefined initialization phone number, which in the present example, causes the analog line to be connected via network 103 to announcement circuit 104. Announcement circuit 104 transmits a CPE alerting sequence (CAS) comprising a 50 millisecond burst of the dual tones 2170 Hertz and 2300 Hertz to determine whether the calling station is an analog display station. Station 20 in muted and then returns a CPE acknowledgement tone (DTMF "A"). Announcement circuit 104 then transmits frequency shift keyed encoded initialization data (display control data) to station 20 for storage in memory 22. The initialization data specifies the content and sequence of the display screens required to lead a customer through activation of any of the nine above-listed telephone features.

Figure 3:
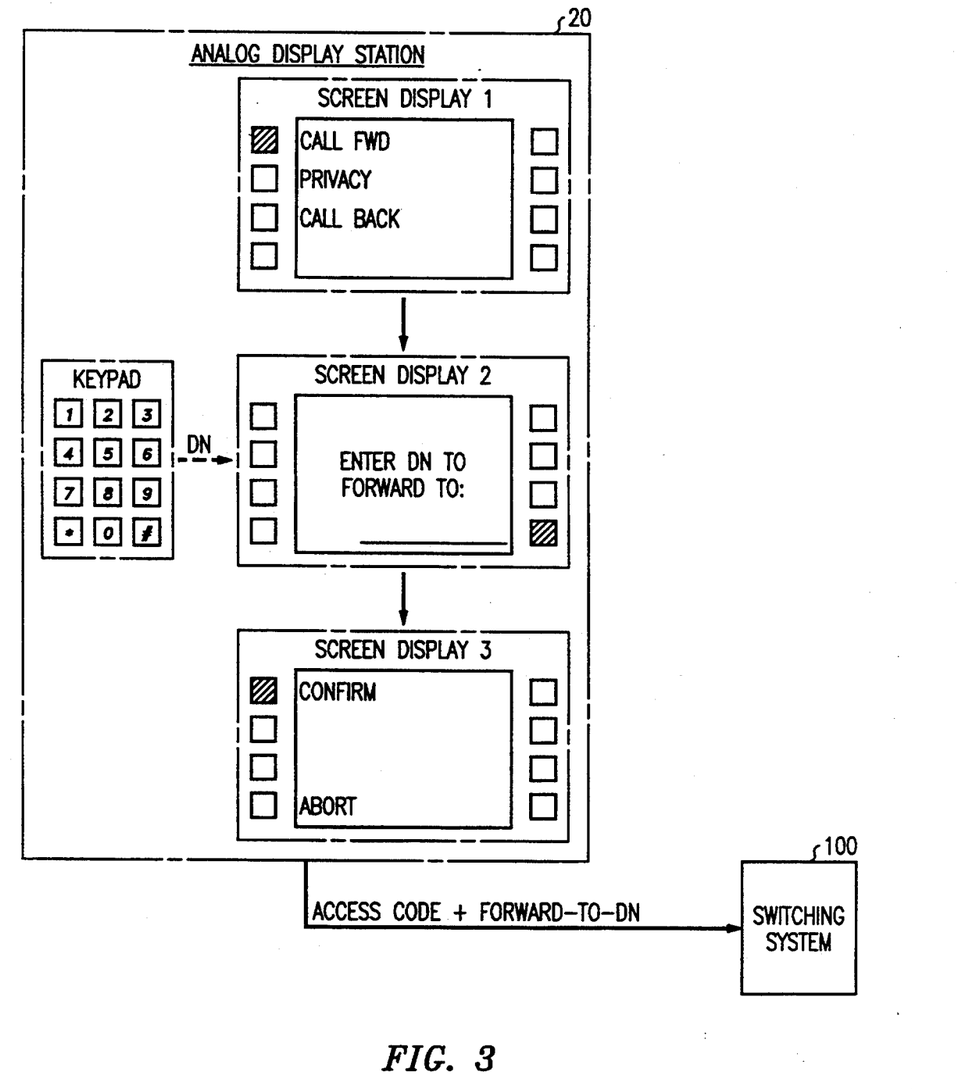
FIG. 3 is a diagram showing a sequence of user inputs and screen displays used by the analog display station of FIG. 1 in activating call forwarding.

FIG. 3 is a diagram showing a sequence of user inputs and screen displays used by analog display station 20 in activating call forwarding. Assume for the present example that station 20 subscribes to only three features. In response to an off-hook condition or a particular user input, screen display 1 is presented to the user. The user pushes the button for call forwarding, and processor 21 stores such user input in memory 22. Processor 21 then consults the display control data stored in memory 22 and causes screen display 2 to be presented to the user. In response, the user enters the forward-to-DN from the keypad, and the forward-to-DN is stored in memory 22. Processor 21 again consults the display control data stored in memory 22 and causes screen display 3 to be presented to the user. The user pushes the confirm button, and in response processor retrieves the call forwarding access code (*72) and the forward-to-DN from memory 21 and causes the transmission of the access code and forward-to-DN from station 20 via the analog line to switching system 100

A number of enhancements to the above exemplary method are possible. For example, rather than receiving the display control data on initialization, it could also be received when a new feature is added or an existing feature is modified. The display control data could be transmitted autonomously by switching system 100 rather than in response to an off-hook or other user signal at station 20. Switching system 100 may identify to the source of display control data that station 20 is of a particular type, and accordingly, the display control data that is transmitted is specific for that station type. Switching system 100 may identify to the source of display control data that switching system 100 is of a particular type, indicating for example the manufacturer, and accordingly, the display control data that is transmitted is specific for communication with that switching system type.

The display control data may be for only those features subscribed to for an identified analog line, or for all telephone features provided by switching system 100. The station could be a digital display station, e.g., an ISDN station, in which case the connecting lines would be digital subscriber lines.

I claim:

1. A method for use by an arrangement comprising a telephone station including a display, a switching system connected via a telephone line to said station and capable of providing a plurality of telephone features for use at said station, and means for selectively connecting a source of display control data to said station, said method comprising the steps of:

receiving, from said source via said connecting means, frequency shift keying modulated signals containing display control data, convening said frequency shift keying modulated signals to display control data, storing said display control data, and effecting at least one of said telephone features, where said effecting comprises the steps of using said stored display control data to communicate information relating to said at least one feature to a user via said display, storing input received from said user in response to said communicated information, and using said stored input to communicate with said switching system to effect said at least one feature, said using said stored display control data step comprises the step of using said stored display control data to communicate information relating to said at least one feature of said plurality of telephone features to a user as a sequence of screens on said display, wherein each of said plurality of telephone features has a respective sequence of screens of a plurality of sequences of screens, said storing input step comprises the step of storing a sequence of inputs from said user each in response to one of said plurality of sequences of screens, and said using said stored input step comprises the step of after at least one of said sequence of inputs has been stored, using said stored sequence of inputs to communicate with said switching system to effect said at least one feature.

2. A method in accordance with claim 1 further comprising the step of identifying said line to said source, where said display control data is specific for said identified line.

3. A method in accordance with claim 2 where said display control data relates only to ones of said features subscribed to for said identified line.

4. A method in accordance with claim 1 where:

said receiving step comprises the step of receiving frequency shift keying modulated signals containing said display control data from said source via said connecting means and said line, said using said stored input step comprises the step of using said stored input to communicate with said switching system via said line to effect said at least one feature.

5. A method in accordance with claim 4 where said line is an analog line.

6. A method in accordance with claim 1 wherein said frequency shift keying signals containing said display control data is received as part of a telephone call via said switching system.

7. A method in accordance with claim 1 where said display control data is for said at least one feature of said plurality of telephone features and is also for other ones of said plurality of telephone features.

8. A method in accordance with claim 1 where said display control data from said source is for all of said plurality of telephone features.

9. A method in accordance with claim 1 further comprising the step of requesting said display control data from said source prior to receiving said frequency shift keying signals containing said display control data.

10. A method for use by an arrangement comprising a telephone station including a display, a switching system connected via a telephone line to said station and capable of providing a plurality of telephone features for use at said station, and means for selectively connecting a source of display control data to said station, said method comprising the steps of:
receiving, from said source via said connecting means, frequency shift keying modulated sills containing display control data,
converting said frequency shift keying modulated signals to display control data,
storing said display control data, and
effecting at least once of said telephone features, where said effecting comprises the steps of
using said stored display control data to communicate information relating to said at least one feature to a user via said display,
storing input received from said user in response to said communicated information, and
using said stored input to communicate with said switching system to effect said at least one feature,
receiving frequency shift keying modulated signals containing display control update data from said source via said connecting means relating to another telephone feature other than said plurality of features,
convening said frequency shift keying modulated signals containing display control update data to display control update data,
storing said received display control update data,
using said stored display control update data to communicate information relating to said another feature to said user via said display,
storing input received from said user in response to said communicated information relating to said another feature, and
using said last-mentioned stored input to communicate with said switching system to effect said another feature.

11. A method for use by an arrangement comprising a telephone station including a display, a switching system connected via a telephone line to said station and capable of providing a plurality of telephone features for use at said station and means for selectively connecting a source of display control data to said station, said method comprising the steps of:
receiving from said source via said connecting means, frequency shift keying modulated signals containing display control data,
converting said frequency shift keying modulated signals to display control data,
storing said display control data, and
effecting at least one of said telephone features, where said effecting comprises the steps of
using said stored display control data to communicate information relating to said at least one feature to a user via said display,
storing input received from said user in response to said communicated information, and
using said stored input to communicate with said switching system to effect said at least one feature,
receiving frequency shift keying modulated signals containing display control update data from said source via said connecting means relating to any one of said plurality of features,
convening said frequency shift keying modulated signals containing display control update data to display control update data,
storing said display control update data,
using said stored display control update data to communicate information relating to said any one feature to said user via said display,
storing input received from said user in response to said communicated information relating to said any one feature, and
using said last-mentioned stored input to communicate with said switching system to effect said any one feature.

12. A method for use by an arrangement comprising a telephone station of a plurality of telephone stations of different types including a display, a switching system of a plurality of switching systems of different types connected via a telephone line to said station and capable of providing a plurality of telephone features for use at said station, and means for selectively connecting a source of display control data to said station, said method comprising the steps of:
receiving, from said source via said connecting means, frequency shift keying modulated signals containing display control data,
storing said display control data, and
converting said frequency shift keying modulated signals to display control data,
effecting at least one of said telephone features, where said effecting comprises the steps of
using said stored display control data to communicate information relating to said at least one feature to a user via said display,
storing input received from said user in response to said communicated information,
using said stored input to communicate with said switching system to effect said at least one feature, and identifying the type of said telephone station to said source, where said control display data from said source is specific for said type of telephone station of said plurality of different types.

13. A method for use by an arrangement comprising a telephone station of a plurality of telephone stations of different types including a display, a switching system of a plurality of switching systems of different types connected via a telephone line to said station and capable of providing a plurality of telephone features for use at said station, and means for selectively connecting a source of display control data to said station, said method comprising the steps of:
receiving from said source via said connecting means, frequency shift keying modulated signals containing display control data, converting said frequency shift keying modulated signals to display control data,
storing said display control data, and
effecting at least one of said telephone features, where said effecting comprises the steps of
using said stored display control data to communicate information relating to said at least one feature to a user via said display,
storing input received from said user in response to said communicated information,
using said stored input to communicate with said switching system to effect said at least one feature, and identifying the type of said switching system to said source, where said control display data provided to said telephone station from said source is specific for said type of switching system of said plurality of different types.

* * * * *

UNITED STATES PATENT AND TRADEMARK OFFICE
CERTIFICATE OF CORRECTION

PATENT NO. : 5,425,097
DATED : June 13, 1995
INVENTOR(S) : Michael Kazimier Pula It is certified that error appears in the above-indentified patent and that said Letters Patent is hereby corrected as shown below:

Column 4, line 18, delete "convening" and and substitute --converting--.

Column 5, line 23, delete "sills" and substitute --signals--.

Column 5, line 43, delete "convening" and substitute --converting--.

Column 6, line 15, delete "convening" and substitute --converting--.

Column 6, line 40, delete "storing said display control data, and"
and substitute --converting said frequency shift keying modulated signals to display control data,--

Column 6, line 41, delete "converting said frequency shift keying modulated signals to display control data" and substitute --storing said display control data, and--.

Signed and Sealed this

Eleventh Day of June, 1996

Attest:

BRUCE LEHMAN

Attesting Officer

Commissioner of Patents and Trademarks